(12) United States Patent
Fernandez

(10) Patent No.: US 6,467,597 B1
(45) Date of Patent: Oct. 22, 2002

(54) DOUBLE ACTING BAULKRING-TYPE SYNCHRONIZER

(75) Inventor: Josevaldo Roberto Fernandez, Salto-Sp (BR)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/711,241

(22) Filed: Nov. 9, 2000

(30) Foreign Application Priority Data

Nov. 12, 1999 (BR) ............................................. 9907360

(51) Int. Cl.⁷ ............................................. F16D 23/06
(52) U.S. Cl. ............................... 192/53.31; 192/53.341
(58) Field of Search .......................... 192/53.31, 53.34, 192/53.341, 48.91

(56) References Cited

U.S. PATENT DOCUMENTS

| | | | | |
|---|---|---|---|---|
| 2,201,169 A | * | 5/1940 | Griswold | 192/53.34 |
| 2,260,863 A | * | 10/1941 | Orr | 192/53.341 |
| 2,495,411 A | * | 1/1950 | Frost | 192/53.34 |
| 2,627,955 A | | 2/1953 | Perkins | |
| 2,941,641 A | | 6/1960 | Stump | |
| 4,138,007 A | | 2/1979 | Wakabayashi | |
| 4,271,943 A | * | 6/1981 | Kuzma | 192/48.91 |
| 4,315,564 A | | 2/1982 | Numazawa | |
| 4,413,715 A | * | 11/1983 | Michael et al. | 192/53.31 |
| 4,869,353 A | | 9/1989 | Ohtsuki | |
| 5,113,986 A | * | 5/1992 | Frost | 192/53.341 |
| 5,497,867 A | * | 3/1996 | Hirsch et al. | 192/109 R |
| 5,544,727 A | | 8/1996 | Braun | |

FOREIGN PATENT DOCUMENTS

DE 3217950 11/1983

* cited by examiner

*Primary Examiner*—Rodney H. Bonck
(74) *Attorney, Agent, or Firm*—Paul S. Rulon; Nevan M. Hinman; Howard D. Gordon

(57) ABSTRACT

A baulkring-type synchronizer (18) includes cone clutch friction surfaces (24,48 and 26,50) for frictionally synchronizing gears (14,16) to a shaft (12), and jaw clutch teeth (28,30) engagable with jaw teeth defined on opposite ends of splines (36) for positive connecting the gears to the shaft. Pluralities of rigid self-energizing members (62) are drivingly interposed between blocker teeth (44,46) affixed to baulkrings (40,42) and self-energizing ramp surfaces (60a–60d) defined on an outer circumference of a hub 32 affixed to the shaft (12). A shift sleeve (34) is slidably splined to the hub (32) and is moved by a shift force and an additive force provided by the self-energizing ramp surfaces. Both forces react against the blocker teeth to engage the friction surfaces. A plurality of circumferentially spaced apart c-shaped rigid members (74) disengage the friction surface of one baulkring prior to engagement of the friction surface of the other baulking in response to the shift sleeve (34) being moved by the shift force from a position having the jaw teeth thereof engaged with the jaw teeth affixed of one drive toward a position for engaging the jaw teeth thereof with the jaw teeth affixed to the other drive.

19 Claims, 2 Drawing Sheets

DOUBLE ACTING BAULKRING-TYPE SYNCHRONIZER

FIELD OF THE INVENTION

This invention relates to a double acting baulkring-type synchronizer.

BACKGROUND OF THE INVENTION

Baulkring-type synchronizers for use in multi-ratio transmissions are well known. Such synchronizers include pairs of friction and jaw members for respectively synchronizing and positive clutching axially spaced apart ratio gears to a shaft, a hub rotatably fixed to the shaft and having external spline teeth slidably receiving internal spline teeth of a shift sleeve, baulkrings having blocker teeth for arresting engaging movement of the shift sleeve until synchronization is reached and for transferring a shift force from the sleeve to friction members. Such synchronizers often include pre-energizer assemblies for effecting initial engagement the friction members in response to initial engaging movement of shift sleeve. It is also known that the shift time and/or shift effort required by a vehicle operator, i.e., force applied to a shift lever, may be reduced by use of synchronizer mechanisms of the self-energizing type. A baulkring-type synchronizer of the self-energizing type may be seen by reference to U.S. Pat. No. 5,544,727, which is incorporated herein by reference.

When double acting baulkring type synchronizers are shifted from an engaged position with one ratio gear to the other ratio gear, the friction clutch of the ratio gear being disengaged may remain engaged enough to continue to transmit torque after the engagement of the friction clutch of the gear being engaged. Thereby tending to rotate the baulkrings relative to each other with damaging forces.

SUMMARY OF THE INVENTION

An object of this invention is to provide a baulkring-type synchronizer with improved friction clutch disengagement.

According to a feature of the invention, a double acting synchronizer selectively synchronizes and positive connects a shaft with either of axially spaced apart first and second drives disposed for relative rotation about an axis of the shaft and axially fixed relative thereto. The synchronizer comprises: A first element is affixed to the shaft concentric to the axis and between the drives. Jaw teeth are affixed to each drive. A friction surface is affixed to each drive. A second element is mounted for rotation with and axial movement relative to the first element. The second element has jaw teeth engagable with the jaw teeth of either of the drives in response to a to-or-fro axial engaging movement of the second element from a neutral position by a shift force. A baulkring is associated with each drive and axially movable relative to each other. Each baulkring is disposed between the first element and the associated drive and each baulkring includes a plurality of pairs of blocker surfaces affixed thereto and a friction surface engagable with the friction surface of the associated drive to produce a synchronizing torque. Blocker surfaces are axially affixed to the second element and engagable with the blocker surfaces of either baulkring in response respectively to the to-or-fro movement of the second element for preventing asynchronous engagement of the engagable jaw teeth, for transmitting the operator shift force across the engaged blocker surfaces to effect engagement of the associated friction surfaces, and for producing a torque counter to the synchronizing torque.

The synchronizer is characterized by rigid member means for disengaging the friction surface of one baulkring prior to engagement of the friction surface the other baulking in response to the second element being moved by the shift force from a position having the jaw teeth thereof engaged with the jaw teeth affixed to one drive toward a position for engaging the jaw teeth thereof with the jaw teeth affixed to the other drive The rigid member means including a plurality of circumferentially spaced apart rigid joining members each having an axially extending portion extending over a radially outer portion of each baulkring and each having radially inwardly extending first and second rigid end portions contactable with axially oppositely facing surfaces of each baulkring for preventing axial separation of the baulkrings in excess to the axially spaced apart first and second rigid end portions.

BRIEF DESCRIPTION OF THE DRAWINGS

The synchronizer of the invention is shown in the accompanying drawings in which:

FIGS. 3 and 4 are plan views of an enlarged self-energizing member of the synchronizer of FIGS. 1 and 2;

FIGS. 5 and 6 are plan views of two enlarged separate portions of the synchronizer of FIG. 1; and FIG. 7 is a schematic view of a self-energizing portion of the synchronizer.

DETAILED DESCRIPTION OF THE DRAWINGS

Figure 1:
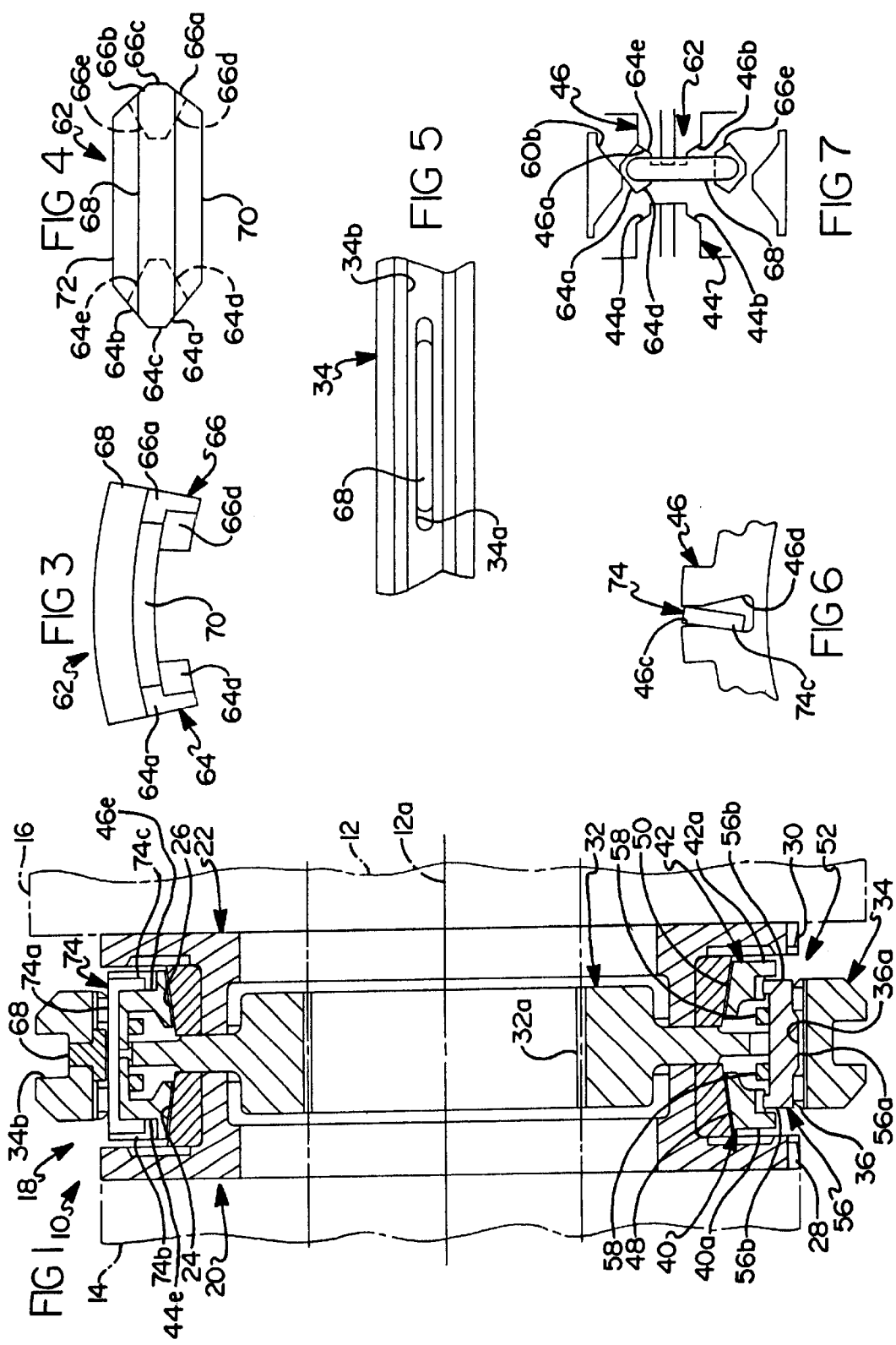
FIG. 1 is a sectional view of a double-acting baulkring-type synchronizer in a neutral position and disposed for rotation about the axis of a shaft.

The term "synchronizer" shall designate a clutch mechanism utilized to non-rotatably couple a selected ratio gear or drive to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer which includes ramps or cams or the like to increase the engaging force of the synchronizing clutch in proportion to the synchronizing torque of the friction clutch.

Looking now at FIGS. 1–7, therein is shown a gear and synchronizer assembly 10 which forms part of a multi-ratio change speed transmission. Assembly 10 includes a shaft 12 shown in phantom lines and mounted for rotation about a central axis 12a, axially spaced apart gears or drives 14,16 also shown in phantom lines and supported on the shaft for rotation relative thereto, and a double-acting synchronizer clutch mechanism 18. The gears are secured against axial movement relative to the shaft in known manner.

The synchronizer clutch mechanism 18 includes annular drives 20,22 axially and rotatably affixed to gears 14,16 in known manner, gear friction surfaces 24,26 herein defined by rings affixed to drives 20,22 in known manner, spline or jaw teeth 28,30 herein integral with drives 20,22, a hub element 32 axially and rotatably affixed at a central opening 32a thereof to shaft 12, a shift sleeve element 34, internal spline teeth 36 defined on a central opening of sleeve element 34 and in constant mesh with external spline teeth 38 (see FIG. 2) defined on the outer circumference of hub element 32, baulkrings 40,42, blocker teeth sets 44,46 and friction surfaces 48,50 herein integral with baulkrings 40,42, a pre-energizer assembly 52, and a self-energizing/blocker assembly 54. Herein, the synchronizer includes three circumferentially spaced apart self-energizing/blocker assemblies 54 which cooperate with a like number of blocker teeth on each baulkring. Each blocker teeth set 44,46 respectively includes angled blocker surfaces 44a,44b,46a,46b.

As is readily seen, friction surfaces 24,48 and 26,50 pair up to define friction clutches for synchronizing the gears to the shaft prior to engagement of the jaw members. Cone clutches are preferred; however, other types of friction clutches may be used. A wide range of cone angles may be used. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used. These patents are incorporated herein by reference.

Figure 2:
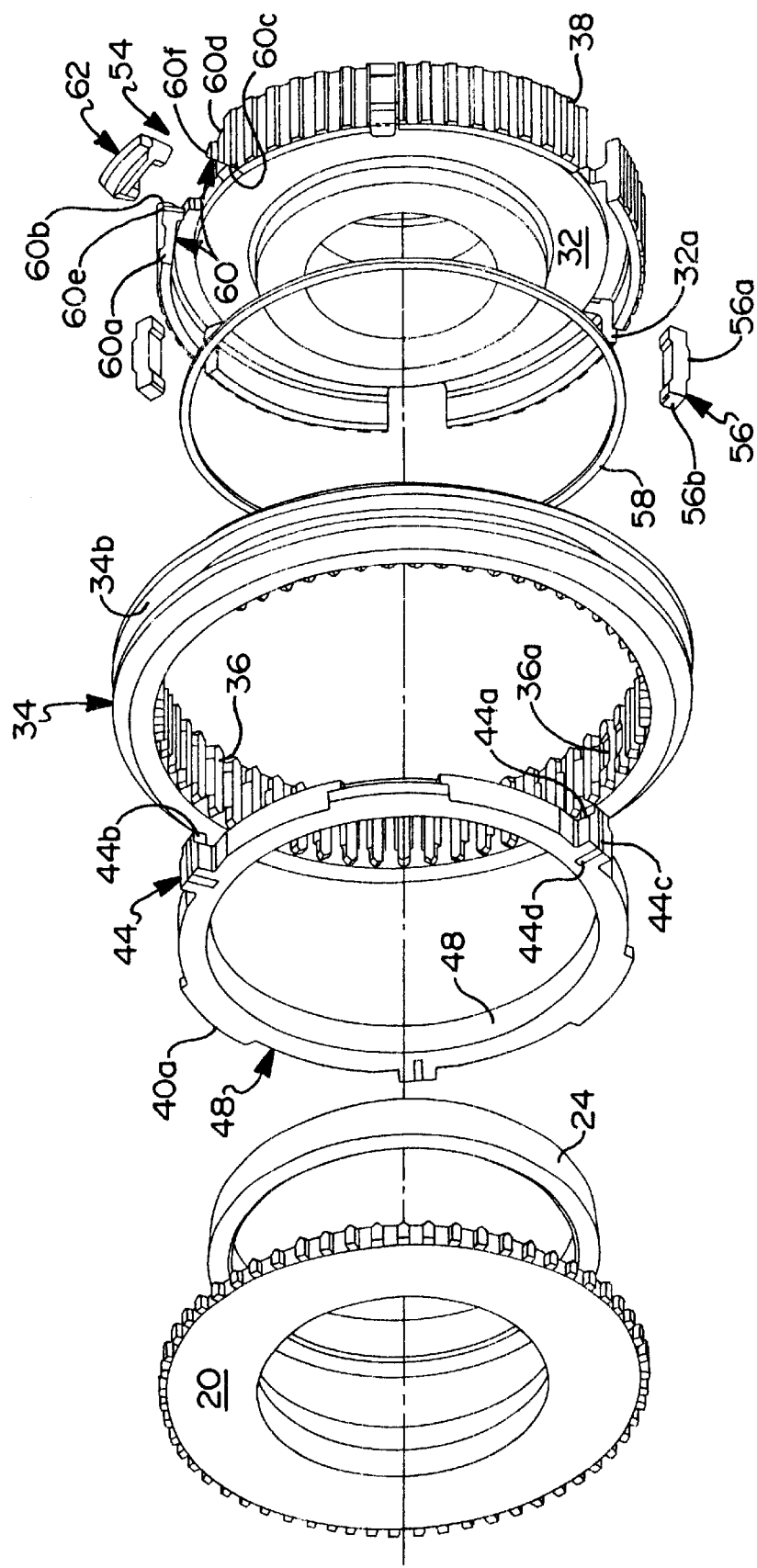
FIG. 2 is an exploded perspective view of portions of the synchronizer of FIG. 1.

Spline teeth 36,38 have axially extending flank surfaces which continuously mate in close sliding relation so that there is relatively no free play between shift sleeve element 34 and hub element 32. Opposite ends of splines 36 define jaw teeth which mate with jaw teeth 28,30 to positive clutch the gears to the shaft. With reference to FIG. 2, the flank side of spline jaw teeth 36 and of jaw teeth 28,30 are provided with an antibackout or locking angle features to prevent inadvertent disengagement of the teeth. Details of this feature may be seen by reference to U.S. Pat. No. 4,727,968 which is incorporated herein by reference.

The pre-energizer assembly 52, which is known in the art, includes three struts 56 disposed in axially extending slots 32a in hub element 32, two c-shaped springs 58 biasing a raised portion 56a of each strut into a detent recess 36a in splines 36. Pre-energizer assembly 52 resiliently positions shift sleeve element 34 in the neutral position shown in FIG. 1. Ends 56b of the struts are axially spaced between abutment surfaces of a plurality of tabs 40a,42a (herein three) formed integral with baulkrings 40,42.

When it is desired to couple either gear to the shaft, an appropriate and unshown shift mechanism is used. An example of such a mechanism is disclosed in U.S. Pat. No. 4,920,815 and incorporated herein by reference. The shift mechanism includes an unshown shift fork received in an annular recess 34b and operative to move shift sleeve element 34 axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift fork. When the shift fork is moved, pre-energizer assemblies 52 apply a pre-energizer force proportional to the shift force applied to the shift sleeve element. Whether manually or automatically applied, the shift force is applied to the shift sleeve element in an axial direction toward the gear to be engaged. The pre-energizer force, depending on direction of shift sleeve element movement by the shift force, moves either friction surface 48 or 50 into initial engagement with its associated friction surface to clock the associated baulkring to a position relative to hub element 32 for positioning the self-energizing/blocker assemblies 54 in a manner explained hereinafter.

Self-energizing/blocker assemblies 54 each comprise self-energizing means 60 including self-energizing or boost ramp surfaces 60a,60b,60c,60d extending oblique to the rotational plane of hub element 32 and defined on opposite ends of recesses in the outer circumference of the hub element, the blocker teeth sets 44,46, and a rigid self-energizing member 62 for reacting blocker and self-energizing forces. Herein, three recesses are shown and each may include boost ramp surfaces 60a,60b,60c,60d. However, only one of the recesses illustrates the ram surfaces. Ramp surfaces 60a,60b and 60c,60d are respectively separated by non-boost surfaces 60e,60f extending perpendicular to the rotational plane of hub element 32. Member 62 includes circumferentially spaced apart self-energizing/ blocker end portions 64,66 rigidly secured together by a circumferentially extending portion 68 received in a circumferentially extending slot 34a in shift sleeve element 34. Arcuate flanges 70,72 extend axially from portion 68. Slot 34a allows limited circumferential movement of member 62 therein relative to the sleeve element and prevents axial movement therein relative to the sleeve element. Flanges 70,72 slidably bear against matting surfaces of shift sleeve element 34 and provide added support for resisting wear of circumferentially extending portion 68 and slot 34a. End portion 64 includes self-energizing ramp surfaces 64a,64b which respectively react against surfaces 60b,60a when shift sleeve element 34 is moved axially left or right, a non-boost surface 64c which reacts against the surface 60e when the synchronizer clutch mechanism 18 is in the neutral position of FIG. 1, and blocker surfaces 64d,64e which respectively react against blocker surfaces 44a,46a of blocker teeth sets 44,46. In a like manner, end portion 66 includes self-energizing ramp surfaces 66a,66b for respectively reacting against the surfaces 60d,60c, a non-boost surface 66c for reacting against the surface 60f, and blocker surfaces 66d, 66e for respectively reacting against the blocker surfaces 44b,46b. The engaged position of non-boost surfaces 60e, 60f,64c,66c prevents unwanted activation of the self-energizing ramps in the event there is some amount of torque produced by one of the cone clutches, e.g., viscous shear of oil between the cone clutch friction surfaces may produce a torque that could otherwise activate the ramps.

Each blocker teeth set 44,46 respectively has an axially extending slot 44c,46c and a radially extending slot 44d,46d defined by slanting walls which increase in circumferential spacing as they extend radially inward from the associated slot 44c,46c. The slanting walls of slot 46d are seen in FIG. 6. The radially extending slots 44d,46d also respectively define axially oppositely facing surfaces 44e,46e. The slots of each baulkring receive a rigid c-shaped joining member 74 having axially extending portion 74a and radially portions 74b and 74c. Axially extending portion 74a extends between end portions 64,66 of member 62 and maintains circumferential positioning of each blocker teeth set relative to the self-energizing/blocker assemblies 54. The radially extending end portions 74b,74c contact axially oppositely facing surfaces 44e,46e to disengage the friction surface of one baulkring prior to engagement of the friction surface of the other baulkring when the shift sleeve element is moved by the shift force from a position having the jaw teeth thereof engaged with the jaw affixed to one drive toward a position for engaging the jaw teeth thereof with the jaw teeth of the other drive. This positive disengagement of one friction clutch prior to engagement of the other friction clutch prevents simultaneous torque transmission by both clutches which tends to rotate the baulkrings relative to each other with damaging forces. The slanting walls of the radially extending slots 44d,46d allow the radially extending end portions 74b,74c of the c-shaped member 74 to move radially into the slots without binding. Such radial movement often occurs when shifting back to neutral or from one engaged drive position to the other and is due to radially outward movement of the end of the c-shaped member spaced away from the drive being disengaged.

At the start of a shift from neutral, teeth sets 44,46 may be circumferentially positioned any place between ends 64,66. Initial rightward axial movement of shift sleeve element 34 by the shift force is transmitted by the pre-energizer assembly struts 56 to baulkring 42 via tab abutment surfaces 42a to effect initial frictional engagement of movable cone surface 50 with gear cone surface 26. The initial engagement force of the cone surface is, of course, a function of the force of springs 58 and the angles of the walls of detent recess 36a. The initial engagement of cone surface 50 causes an initial synchronizing torque to be transmitted across cone surfaces 50,26, assuming an asynchronous condition exists. This initial torque rotates baulkring 42 relative to the hub element and shift sleeve element enough to engage blocker surfaces 64e,46a, thereby allowing transmission of the shift force directly across the engaged blocker surfaces. When these blocker surfaces are engaged, the shift force applied to self-energizing member 62 from shift sleeve element 34 is transmitted to baulkring 42, thereby engaging friction surfaces 26,50 with full shift force for producing a synchronizing torque.

Looking now at the schematic of FIG. 7, it can be seen that the rightward movement of shift sleeve element 34 and the synchronizing torque produced by engaged friction surfaces 26,50 has caused boost ramps 60b,64a to engage and react the synchronizing torque, thereby producing a rightward additive axial force which is transmitted to baulkring 42 via engaged blocker surfaces 64e,46a, thereby increasing the engagement force of friction surfaces 26,50. Operation of the other blocker surfaces and boost ramps is analogous to the of blocker surfaces 64e,46a and boost ramps 60b,64a. A more detailed description of the operation of the blocker surfaces and boost ramps may be to obtained by reference to previously mentioned U.S. Pat. No. 5,544, 727. If self-energizing ramp surfaces 60b,64a were normal to the plane of rotation of hub element 32, no self-energizing forces would be produced. Also, since blocker surfaces 64e,46a are oblique to the plane of rotation, they in addition to preventing asynchronous engagement of spline jaw teeth 36 and transmitting the shift force to friction surfaces 26,50, also produce a counter torque or unblocking torque counter to the synchronizing torque but of lesser magnitude during asynchronous conditions. As substantial synchronism is reached, the synchronizing torque drops below the unblocking torque, whereby the blocker teeth move out of engagement to allow continued axial movement of the shift sleeve element and engagement of spline 36 jaw teeth with drive jaw teeth 30.

A double acting synchronizer with positive disengagement of the cone friction surfaces has been disclosed. The synchronizer may include self-energizing. The following claims are intended to cover the inventive portions of the disclosed synchronizer.

What is claimed is:

1. A double acting baulkring-type synchronizer for selectively synchronizing and positive connecting a shaft with either of axially spaced apart first and second drives disposed for relative rotation about an axis of the shaft and axially fixed relative thereto; the synchronizer comprising:

a first element affixed to the shaft concentric to the axis and between the drives;

jaw teeth affixed to each drive;

a friction surface affixed to each drive;

a second element mounted for rotation with and axial movement relative to the first element, the second element having jaw teeth engagable with the jaw teeth of either of the drives in response to a to-or-fro axial engaging movement of the second element from a neutral position by a shift force;

a baulkring associated with each drive and axially movable relative to the first element, each baulkring disposed between the first element and the associated drive, and each baulkring including a plurality of pairs of blocker surfaces affixed thereto and a friction surface engagable with the friction surface affixed to each drive to produce a synchronizing torque;

blocker surfaces axially affixed to the second element and engagable with the blocker surfaces of either baulkring in response respectively to the to-or-fro movement of the second element for preventing asynchronous engagement of the engagable jaw teeth, for transmitting the operator shift force across the engaged blocker surfaces to effect engagement of the associated friction surfaces, and for producing a torque counter to the synchronizing torque; and rigid member means for disengaging the friction, surface of one baulkring prior to engagement of the friction surface of the other baulkring in response to the second element being moved by the shift force from a position having the second element jaw teeth thereof engaged with the jaw teeth affixed to one drive toward a position for engaging the jaw teeth thereof with the jaw teeth affixed to the other drive; and the rigid member means including a plurality of circumferentially spaced apart rigid joining members each having an axially extending portion extending over a radially outer portion of each baulkring and each having radially inwardly extending and axially spaced apart first and second rigid end portions contactable with axially oppositely facing surfaces of each baulkring for preventing axial separation of the baulkrings in excess to the axially spaced apart first and second rigid end portions.

2. The synchronizer of claim 1, wherein:

the radially outer portion of each baulkring includes axially extending slots and one of the rigid member axially extending portions are disposed in one axially extending slot of each baulkring for limiting rotation of the baulkrings relative to each other.

3. The synchronizer of claim 2, wherein:

each baulkring has a radial slot extending radially inward from each axially extending slot and receiving one of the end portions.

4. The synchronizer of claim 3, wherein:

each radial slot extending radially inward has slanting side walls which increase in circumferential spacing as they extend radially inward from the axially extending slots.

5. The synchronizer of claim 1, further including:

self-energizing means operative when engaged to react the synchronizing torque for producing an additive axial force for increasing the engagement force of the engaged friction surfaces.

6. The synchronizer of claim 5, wherein:

the self-energizing means includes means for directing the additive axial force to the engaged friction surfaces via the engaged blocker surfaces.

7. The synchronizer of claim 6, wherein:

the self-energizing means includes a plurality of circumferentially spaced apart recesses in the hub outer circumference and a rigid self-energizing member disposed in each recess, each recess having first and second self-energizing ramp surfaces respectively facing axially on an angle in the direction of first and second drives, each self-energizing member including first and second circumferentially spaced apart ends rigidly secured together by a circumferentially extending portion slidably received in a slot in the sleeve for allowing limited rotation and non-axial movement relative to the sleeve, each first end including third and fourth self-energizing ramp surfaces respectively engagable with the first and second ramp surfaces and each first and second circumferentially spaced apart end including the blocker surfaces axially affixed to the shift sleeve element, and each first and second circumferentially spaced apart ends having one of the axially extending portions of the joining rigid members extending therebetween.

8. The synchronizer of claim 7, wherein:
at least one rigid joining member includes circumferentially oppositely facing surfaces operative to contact portions of one of the rigid self-energizing member first and second circumferentially spaced apart ends for maintaining circumferential positioning of the first and second blocker surfaces relative to each other.

9. The synchronizer of claim 8, further including:
self-energizing means operative when engaged to react the synchronizing torque for producing an additive axial force directed across the engaged blocker surfaces and in the direction of the shift force for increasing the engagement force of the engaged friction surfaces, the self-energizing means including a plurality of circumferentially spaced apart recesses in the hub outer circumference and a rigid self-energizing member disposed in each recess, each recess having circumferentially spaced apart ends defining a circumferential extent thereof, at least one of the ends including first and second self-energizing ramp surfaces respectively facing axially on an angle in the direction of first and second drives, each rigid self-energizing member including first and second circumferentially spaced apart ends rigidly secured together by a circumferentially extending portion slidably received in a slot in the second element for allowing limited rotation and non-axial movement relative to the second element, each first circumferentially spaced end including third and fourth self-energizing ramp surfaces respectively engagable with the first and second ramp surfaces and each first and second circumferentially spaced apart end including the blocker surfaces axially affixed to the shift sleeve, and during synchronization each first circumferentially spaced end positioned between one of the recess self-energizing ramp surfaces and one of the baulkring blocker surfaces such that both the axially directed shift force and the additive axial force are transferred across the rigid self-energizing member; and
one of the rigid self-energizing member first and second circumferentially spaced apart ends having one of the axially extending portions of the rigid joining members extending therebetween.

10. The synchronizer of claim 9, wherein:
the one rigid joining member includes circumferentially oppositely facing surfaces operative to contact portions of the one of the rigid self-energizing member first and second circumferentially spaced apart ends for maintaining circumferential positioning of the first and second blocker surfaces relative to each other.

11. A double acting baulkring-type synchronizer for selectively synchronizing and positive connecting a shaft with either of axially spaced apart first and second drives disposed for relative rotation about an axis of the shaft and axially fixed relative thereto; the synchronizer comprising:
a hub affixed to the shaft concentric to the axis and between the drives, an outer circumference of the hub having external splines;
jaw teeth affixed to each drive;
a friction surface affixed to each drive;
a shift sleeve having internal splines mating with the hub external splines and having ends defining jaw teeth engagable with the jaw teeth of either of the drives in response to a to-or-fro axial engaging movement of the sleeve from a neutral position by an shift force;
a baulkring associated with each drive, each baulkring disposed between the hub and the associated drive, each baulkring including a plurality of pairs of blocker surfaces affixed thereto and a friction surface engagable with the friction surface affixed to each drive to produce a synchronizing torque;
blocker surfaces axially affixed to the sleeve and engagable with the blocker surfaces of either baulkring in response respectively to the to-or-fro movement of the sleeve for preventing asynchronous engagement of the engagable jaw teeth, for transmitting the operator shift force across the engaged blocker surfaces to effect engagement of the associated friction surfaces, and for producing a torque counter to the synchronizing torque;
self-energizing means operative when engaged to react the synchronizing torque for producing an additive axial force directed across the engaged blocker surfaces and in the direction of the shift force for increasing the engagement force of the engaged friction surfaces, the self-energizing means including a plurality of circumferentially spaced apart recesses in the hub outer circumference and a rigid self-energizing member disposed in each recess, each recess having circumferentially spaced apart ends defining a circumferential extent thereof, at least one of the ends including first and second self-energizing ramp surfaces respectively facing axially on an angle in the direction of first and second drives, each rigid self-energizing member including first and second circumferentially spaced apart ends rigidly secured together by a circumferentially extending portion slidably received in a slot in the sleeve for allowing limited rotation and non-axial movement relative to the sleeve, each first end including third and fourth self-energizing ramp surfaces respectively engagable with the first and second ramp surfaces and each first and second circumferentially spaced apart end including the blocker surfaces axially affixed to the shift sleeve, and during synchronization each first end positioned between one of the recess self-energizing ramp surfaces and one of the baulkring blocker surfaces such that both the axially directed shift force and the additive axial force are transferred across the rigid self-energizing member; and
a plurality of circumferentially spaced apart rigid joining members for disengaging the friction surface of one baulkring prior to engagement of the friction surface of the other baulkring in response to the shift sleeve being moved by the shift force from a position having, the jaw teeth thereof engaged with the jaw teeth affixed to one drive toward a position for engaging the jaw teeth thereof with the jaw teeth affixed to the other drive; and each rigid joining member having an axially extending portion extending over a radially outer portion of each baulkring and having radially inwardly extending first and second rigid end portions contactable with axially oppositely facing surfaces of each baulkring for preventing axial separation of the baulkrings in excess to the axially spaced apart first and second rigid end portions.

12. The synchronizer of claim 11, wherein:

the radially outer portion of each baulkring includes axially extending slots and one of the rigid member axially extending portions are disposed in one axially extending slot of each baulkring for limiting rotation of the baulkrings relative to each other.

13. The synchronizer of claim 12, wherein:

each baulkring has a radial slot extending radially inward from each axially extending slot and receiving one of the end portions.

14. The synchronizer of claim 13, wherein:

each radial slot extending radially inward has slanting side walls which increase in circumferential spacing as they extend radially inward from the axially extending slots.

15. The synchronizer of claim 11, wherein:

each first and second circumferentially spaced ends has one of the axially extending portions of the rigid joining members extending therebetween; and at least one rigid joining member includes circumferentially oppositely facing surfaces operative to contact portions of one of the rigid self-energizing member first and second circumferentially spaced apart ends for maintaining circumferential positioning of the first and second blocker surfaces relative to each other.

16. A double acting baulkring-type synchronizer for selectively synchronizing and positive connecting a shaft with either of axially spaced apart first and second drives disposed for relative rotation about an axis of the shaft and axially fixed relative thereto; the synchronizer comprising:

a first element affixed to the shaft concentric to the axis and between the drives;

jaw teeth affixed to each drive;

a friction surface affixed to each drive;

a second element mounted for rotation with and axial movement relative to the first element, the second element having jaw teeth engagable with the jaw teeth of either of the drives in response to a to-or-fro axial engaging movement of the second element from a neutral position by a shift force;

a baulkring associated with each drive, each baulkring disposed between the first element and the associated drive and having a friction surface engagable with the friction surface affixed to each drive to produce a synchronizing torque;

first blocker surfaces axially affixed to the second element and engagable with second blocker surfaces axially affixed to either baulkring in response respectively to the to-or-fro movement of the second element for preventing asynchronous engagement of the engagable jaw teeth and for transmitting the operator shift force across the engaged blocker surfaces to effect engagement of the associated friction surfaces;

a plurality of circumferentially spaced apart rigid joining members for disengaging the friction surface of one baulkring prior to engagement of the friction surface of the other baulkring in response to the second element being moved by the shift force from a position having the jaw teeth thereof engaged with the jaw teeth affixed to one drive toward a position for engaging the jaw teeth thereof with the jaw teeth affixed to the other drive; and each rigid joining member having an axially extending portion extending over a radially outer portion of each baulkring and having radially inwardly extending first and second rigid end portions engagable with axially oppositely facing surfaces of each baulkring for preventing axial separation of the baulkrings in excess to the axially spaced apart first and second rigid end portions.

17. A double acting baulkring-type synchronizer for selectively synchronizing and positive connecting a shaft with either of axially spaced apart first and second drives disposed for relative rotation about an axis of the shaft and axially fixed relative thereto; the synchronizer comprising:

a hub affixed to the shaft concentric to the axis and between the drives, an outer circumference of the hub having external splines;

jaw teeth affixed to each drive;

a friction surface affixed to each drive;

a shift sleeve having internal splines mating with the hub external splines and having ends defining jaw teeth engagable with the jaw teeth of either of the drives in response to a to-or-fro axial engaging movement of the sleeve from a neutral position by an shift force;

a baulkring associated with each drive, each baulkring disposed between the hub and the associated drive and having a friction surface engagable with the friction surface affixed to each drive to produce a synchronizing torque;

first and second blocker surfaces axially affixed respectively to the sleeve and each baulkring and engagable in response respectively to the to-or-fro movement of the sleeve for preventing asynchronous engagement of the engagable jaw teeth and for transmitting the operator shift force across the engaged blocker surfaces to effect engagement of the associated friction surfaces;

self-energizing means operative when engaged to react the synchronizing torque for producing an additive axial force directed across the engaged blocker surfaces and in the direction of the shift force for increasing the engagement force of the engaged friction surfaces, the self-energizing means including a plurality of circumferentially spaced apart recesses in the hub outer circumference and a rigid self-energizing member disposed in each recess, each recess having circumferentially spaced apart ends defining a circumferential extent thereof, at least one of the ends including first and second self-energizing ramp surfaces respectively facing axially on an angle in the direction of first and second drives, each rigid self-energizing member including first and second circumferentially spaced apart ends rigidly secured together by a circumferentially extending portion slidably received in a slot in the sleeve for allowing limited rotation and non-axial movement relative to the sleeve, each first end including third and fourth self-energizing ramp surfaces respectively engagable with the first and second ramp surfaces and each first and second circumferentially spaced apart end including the first blocker, and during synchronization each first end positioned between one of the recess self-energizing ramp surfaces and the second blocker surfaces such that both the axially directed shift force and the additive axial force are transferred across the rigid self-energizing member; and a plurality of circumferentially spaced apart rigid joining members for disengaging the friction surface of one baulkring prior to engagement of the friction surface of the other baulkring in response to the shift sleeve being moved by the shift force from a position having the jaw teeth thereof engaged with the jaw teeth affixed to one drive toward a position for engaging the jaw teeth thereof with the jaw teeth affixed to the other drive;

each rigid joining member having an axially extending portion extending over a radially outer portion of each baulkring and having radially inwardly extending first and second rigid end portions contactable with axially oppositely facing surfaces of each baulkring for preventing axial separation of the baulkrings in excess to the axially spaced apart first and second rigid end portions.

18. The synchronizer of claim 17, wherein:

each first and second circumferentially spaced apart ends having one of the axially extending portions of the rigid joining members extending therebetween.

19. The synchronizer of claim 18, wherein:

at least one rigid joining member includes circumferentially oppositely facing surfaces operative to contact portions of one of the first and second circumferentially spaced apart ends for maintaining circumferential positioning of the first and second blocker surfaces relative to each other.

\* \* \* \* \*